United States Patent
Buzak et al.

(10) Patent No.: US 6,597,412 B1
(45) Date of Patent: Jul. 22, 2003

(54) LIQUID CRYSTAL DISPLAY DEVICE EMPLOYING FIBER SPACERS

(75) Inventors: Thomas S. Buzak, Beaverton, OR (US); Kevin J. Ilcisin, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/548,447

(22) Filed: Apr. 13, 2000

Related U.S. Application Data

(60) Provisional application No. 60/132,069, filed on Apr. 28, 1999.

(51) Int. Cl.[7] ............................................. G02F 1/1336
(52) U.S. Cl. ................................... 349/32; 313/582
(58) Field of Search ................... 349/32; 313/518–519, 313/582–587; 315/169.4

(56) References Cited

U.S. PATENT DOCUMENTS

| | | | | |
|---|---|---|---|---|
| 5,440,411 A | * | 8/1995 | Fujiwara et al. | 349/116 |
| 6,057,895 A | * | 5/2000 | Van Helleputte et al. | 349/187 |
| 6,097,141 A | * | 8/2000 | Jeong et al. | 313/385 |
| 6,285,127 B1 | * | 9/2001 | Khan et al. | 313/582 |

* cited by examiner

*Primary Examiner*—James Dudek
(74) *Attorney, Agent, or Firm*—John D. Winkelman; John Smith-Hill

(57) ABSTRACT

An array of parallel spaced fiber segments is attached to the flat upper surface of a transparent plate. The transparent plate and the fiber segments preferably are made of glass, with the fiber segments bonded to the transparent plate with fused glass frit or by sintering under pressure. The plate and attached fiber segments suitably are embodied in the channel substrate for a plasma-addressed display device, such as a PALC panel.

3 Claims, 2 Drawing Sheets

LIQUID CRYSTAL DISPLAY DEVICE EMPLOYING FIBER SPACERS

CROSS REFERENCED TO RELATED APPLICATIONS

This application claims the benefit of U.S. Provisional Application No. 60/132,069, filed Apr. 28, 1999.

BACKGROUND OF THE INVENTION

This invention relates to a plasma addressed liquid crystal device employing fiber spacers.

U.S. Pat. No. 5,077,553 discloses apparatus for addressing data storage elements. A practical implementation of the apparatus shown in U.S. Pat. No. 5,077,553 is illustrated schematically in FIG. 1 of the accompanying drawings.

The display panel shown in FIG. 1 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 1), an upper substrate 14 carrying the data drive electrodes, and an upper polarizer 16. In the case of a color display panel, the panel includes color filters (not shown) between the layer 10 and the upper substrate 14. The panel may also include layers for improving viewing angle and for other purposes. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. The region of the upper surface of the display panel that bounds the panel element constitutes a single pixel 30 of the display panel.

When the anode 24 in one of the channels is connected to a reference potential and a suitably more negative voltage is applied to the cathode 26 in that channel, the gas in the channel forms a plasma which provides a conductive path to the reference potential at the lower surface of the cover sheet 6. If a data drive electrode is at the reference potential, there is no significant electric field in the volume element of electro-optic material in the panel element at the crossing of the channel and the data drive electrode and the panel element is considered to be off, whereas if the data drive electrode is at a substantially different potential from the reference potential, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material rotates the plane of polarization of linearly polarized light passing therethrough by an angle which is a function of the electric field in the electro-optic material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the electro-optic material toward the upper polarizer 16 and a viewer 32. If the panel element is off, the plane of polarization of linearly polarized light passing through the volume element of electro-optic material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of electro-optic material. The plane of polarization of light incident on the upper polarizer element is at 0° and therefore the light is blocked by the upper polarizer element and the pixel is dark. If the electric field in the volume element of electro-optic material is intermediate the values associated with the panel element being off and on, light is passed by the upper polarizer element with an intensity which depends on the electric field, allowing a gray scale to be displayed.

In a practical implementation of the PALC display panel, the channel member 4 is etched back around the area in which the channels are formed in order to provide a plateau 36 in which the channels 20 are formed, and the cover sheet 6 is secured to the channel member by an endless frit bead 38 in a rabbet 40 extending around the periphery of the plateau. An upper substrate assembly, including the upper substrate 14 and the data drive electrodes 12 carried thereby, is attached to the channel member 4 by means of a glue bead 42.

It is important to proper functioning of the PALC device that the cover sheet be spaced from the channel substrate at least along the channels, to allow a plasma chamber to be defined between the cover sheet and the channel substrate. In accordance with the prior art, this spacing is provided by the ribs that define the plasma channels.

The channel substrate shown in FIG. 1 is manufactured by a subtractive process, in which a glass plate is selectively etched to form the channels. Possible disadvantages of the subtractive process are that the etching operation is expensive and imposes constraints on the cross-sectional shape of the channels. Further, it has been found difficult in practice to form the channel electrodes otherwise than by use of evaporative or sputter deposition and photolithographic processes.

Another known technique for forming the channel substrate of a PALC panel employs an additive process, in which the channel electrodes are deposited on a substantially flat surface of a glass plate and the ribs are then built up on the glass plate by screen printing. The additive process is time consuming because numerous printing stages are needed to build up the ribs, and it is difficult because of the need for accurate registration of successive printing screens. Further, the ribs are not of uniform height and steps must be taken to bring the ribs to uniform height before the cover sheet is applied.

The conventional processes are subject to disadvantage not only because of difficulty in manufacturing the channel substrate but also because of the possibility of damage to the cover sheet during assembly of a panel. Thus, the ribs have relatively sharp edges and there is a possibility that stresses induced in the cover sheet at the sharp edges will damage the cover sheet. Further, the tops of the ribs are flat and there is a possibility that hard particles, such as glass shards, will be trapped between the tops of the ribs and the cover sheet and that stresses induced in the cover sheet by the hard particles will damage the cover sheet.

SUMMARY OF THE INVENTION

In accordance with the invention there is provided an article of manufacture comprising a transparent plate having a substantially flat upper surface, and an array of substantially parallel spaced fiber segments attached to the upper surface of the transparent plate.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate like or corresponding components.

In this specification, words of orientation and position, such as upper and lower, are used to establish orientation and position relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

Figure 1:
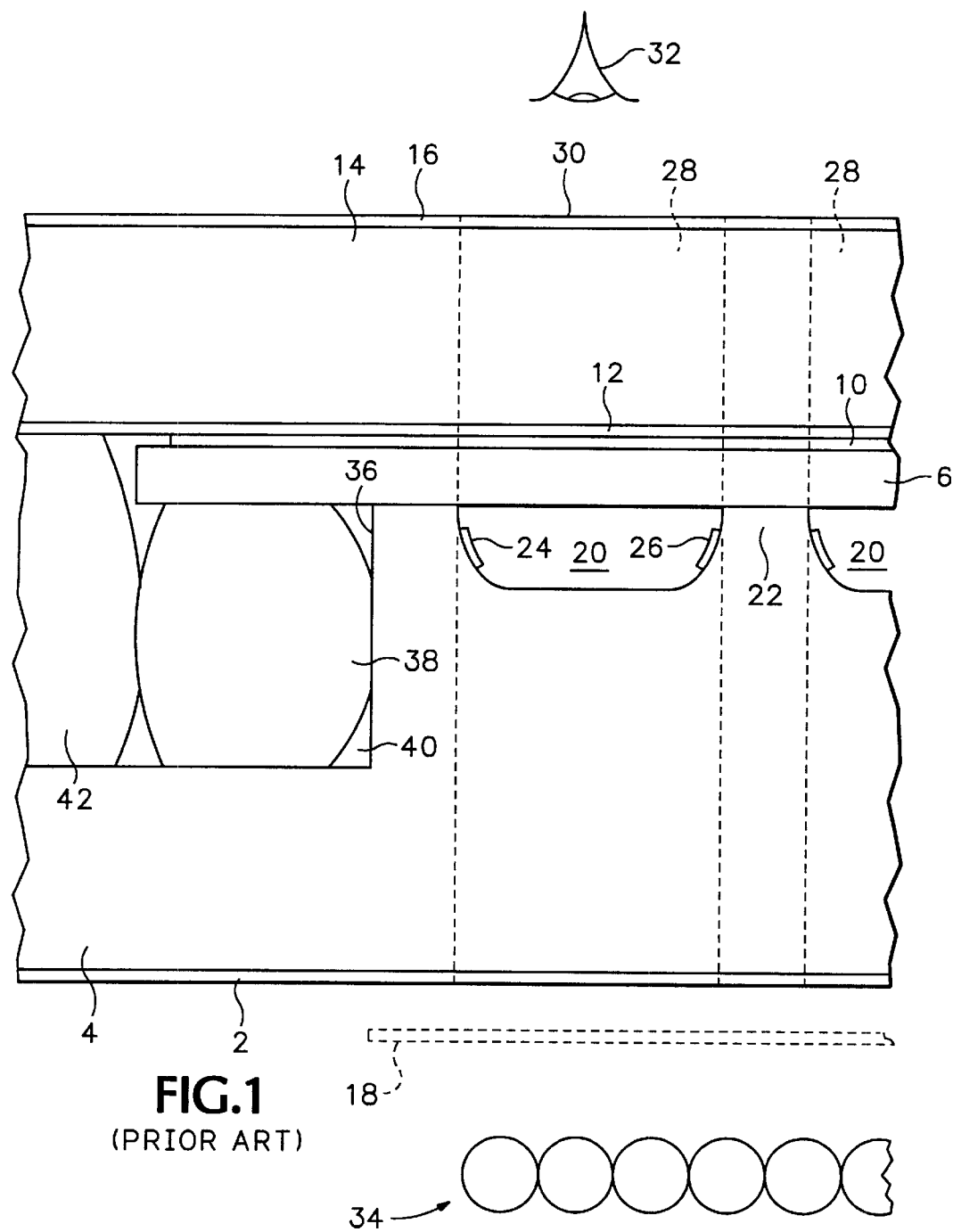
FIG. 1 is a partial sectional view of a PALC display panel in accordance with the prior art.
Figure 2:
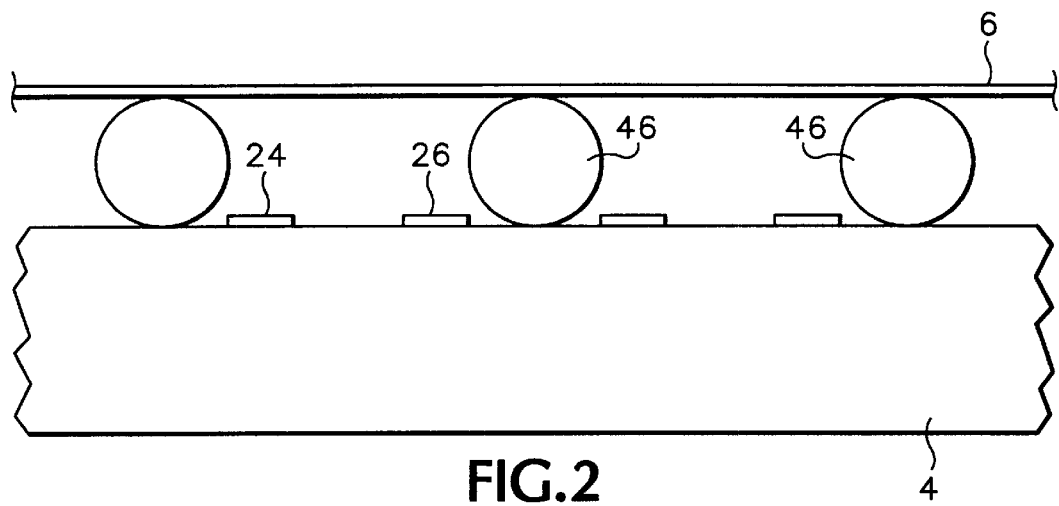
FIG. 2 is a partial sectional view of a PALC display panel in accordance with the present invention.

Referring to FIG. 2, the channel substrate of a PALC panel is manufactured by depositing electrodes 24 and 26 on the flat upper surface of a transparent glass plate 4 and attaching an array of parallel, spaced fiber segments 46 to the upper surface of the glass plate.

Figure 3:
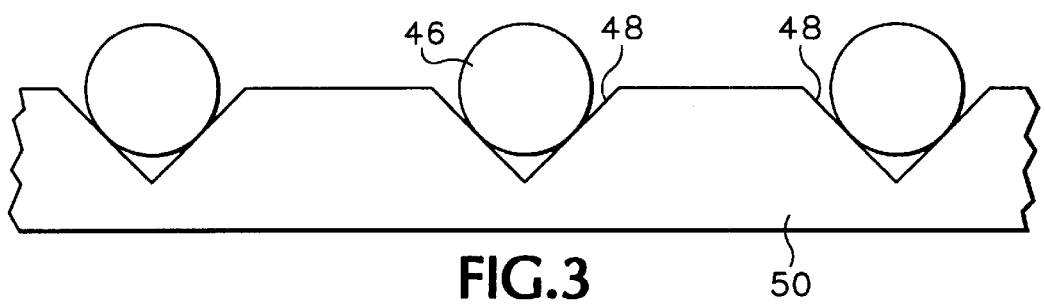
FIG. 3 is a partial sectional view illustrating a first stage in manufacture of the PALC panel shown in FIG. 2.
Figure 4:
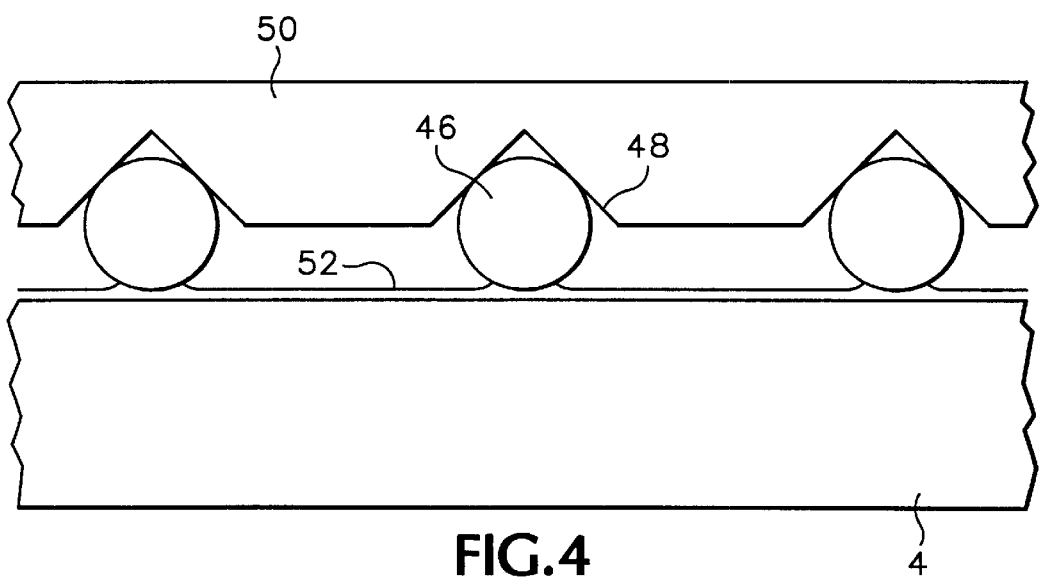
FIG. 4 is a similar view to FIG. 3 illustrating a second stage in manufacture of the PALC panel shown in FIG. 2.

There are many choices in layout of the fiber segments 46 relative to the electrodes 24 and 26. There are also many choices for attachment of the fiber segments 46 to the plate 4. For example, in the case of the method illustrated with reference to FIGS. 3 and 4, the fiber segments 46 are made of glass and length segments of fiber are placed in respective channels 48 of an attachment fixture 50 and are bonded to the fixture 50, for example using a suitable organic adhesive. A coating 52 of frit is placed on the upper surface of the glass plate 4 and the fixture 50 loaded with fiber segments 46 is inverted and placed on top of the frit coating 52, as shown in FIG. 4. The coating need not be continuous but could be patterned. The assembly of the glass plate, the fiber segments and the attachment fixture is placed in a frit oven in which the assembly is heated to the melting point of the frit. During the heating operation, the organic adhesive decomposes and is driven off, so the fiber segments 46 are no longer bonded to the fixture 50. When the assembly cools, the fused frit bonds the fiber segments 46 to the glass plate 4, and the fiber segments 46 remain secured to the plate 4 when the fixture 50 is lifted from the plate 4 and the fiber segments attached thereto.

Alternatively, the fiber segments 46 may be bonded to the glass plate 4 by sintering under pressure at a lower temperature.

Use of an array of fiber segments to space the cover sheet 6 from the glass plate 4 has numerous advantages relative to the ribs formed by the additive and subtractive processes described above. High quality glass fiber of uniform cross-section, suitable diameter and low number of defects per unit length is inexpensive and readily available due to the high demand for glass fiber for optical fiber communication. Although glass fiber for fiber optic communication is circular in cross-section, the techniques used for manufacturing glass fiber can be used to manufacture fiber of other cross-sectional shapes, and the cross-sectional shape of the fiber can be selected to influence favorably the aperture ratio of the display panel. Preferably the cross-sectional shape is rounded at least where the cover sheet contacts the fiber segments so that there are no sharp edges that might damage the cover sheet and there is no flat surface that would serve to trap a particle that could damage the cover sheet when the cover sheet is applied to the array of fiber segments.

Of course, glass fiber for fiber optic communication is not homogeneous but has at least two coaxial layers, but homogeneous fibers can also be manufactured.

Processes that can be employed for placing the fiber segments in a parallel array have been developed, for example in the textile industry, and accordingly the operation of placing the fiber segments in the parallel array can be performed inexpensively.

It is conventional to provide a light absorbing mask around each pixel of a PALC display panel. Hitherto, it has been necessary to align the mask along two orthogonal dimensions, which contributes to the cost of manufacturing a PALC panel. By use of opaque fiber segments to space the cover sheet from the glass plate, the fiber segments themselves serve as part of the light absorbing mask around each pixel. The opaque fiber segment is self-aligned in one dimension, which reduces the number of critical alignment operations needed in manufacture of the panel.

It will be appreciated that the invention is not restricted to the particular embodiment that has been described, and that variations may be made therein without departing from the scope of the invention as defined in the appended claims and equivalents thereof. For example, although the invention has been described with reference to a PALC panel, in which the plasma is used for addressing and does not serve as a light source, it may also find application in a plasma display panel in which plasma is formed only at the addressed pixels and serves as a light source.

What is claimed is:

1. A channel substrate for a plasma-addressed display device, comprising a transparent glass plate having a substantially flat upper surface, and an array of substantially parallel spaced glass fiber segments attached to the upper surface of the transparent plate, the fiber segments being substantially circular in cross-section, forming ribs that define a plurality of channels in an assembled display device.

2. A channel substrate for a plasma-addressed display device, comprising a transparent glass plate having a substantially flat upper surface, and an array of substantially parallel spaced glass fiber segments attached to the upper surface of the transparent plate by fused glass frit, forming ribs that define a plurality of channels in an assembled display device.

3. A channel substrate for a plasma-addressed display device, comprising a transparent glass plate having a substantially flat upper surface, and an array of substantially parallel spaced glass fiber segments attached to the upper surface of the transparent plate by sintering under pressure, forming ribs that define a plurality of channels in an assembled display device.

* * * * *